United States Patent
Kuronuma et al.

(10) Patent No.: US 11,095,873 B2
(45) Date of Patent: Aug. 17, 2021

(54) HEAD-MOUNTED DISPLAY

(71) Applicant: SONY INTERACTIVE ENTERTAINMENT INC., Tokyo (JP)

(72) Inventors: Toru Kuronuma, Tokyo (JP); Toshihiro Kusunoki, Tokyo (JP); Hirohito Suzuki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/647,933

(22) PCT Filed: Aug. 24, 2018

(86) PCT No.: PCT/JP2018/031427
§ 371 (c)(1),
(2) Date: Mar. 17, 2020

(87) PCT Pub. No.: WO2019/058875
PCT Pub. Date: Mar. 28, 2019

(65) Prior Publication Data
US 2020/0267378 A1 Aug. 20, 2020

(30) Foreign Application Priority Data
Sep. 22, 2017 (JP) .............................. JP2017-182324

(51) Int. Cl.
*G09G 5/00* (2006.01)
*H04N 13/332* (2018.01)
*G02C 5/12* (2006.01)

(52) U.S. Cl.
CPC ........... *H04N 13/332* (2018.05); *G02C 5/124* (2013.01)

(58) Field of Classification Search
CPC .......... G02B 7/00; G02B 7/002; G02B 27/01; G02B 27/0176; H04N 5/34; H04N 13/332; G02C 5/12; G02C 5/122; G02C 5/124
See application file for complete search history.

(56) References Cited

U.S. PATENT DOCUMENTS 2,082,070 A * 6/1937 Lowres ..................... G02C 5/12
351/137
2,986,971 A * 6/1961 Jent ......................... G02C 5/124
351/55

(Continued)

FOREIGN PATENT DOCUMENTS

JP 6-141258 A 5/1994
JP 2002-529764 A 9/2002

(Continued)

OTHER PUBLICATIONS

International Preliminary Report on Patentability dated Apr. 2, 2020, from International Patent Application No. PCT/JP2018/031427, 13 sheets.

(Continued)

*Primary Examiner* — Joe H Cheng
(74) *Attorney, Agent, or Firm* — Katten Muchin Rosenman LLP

(57) ABSTRACT

A head-mounted display that can suppress positional misalignment of a display apparatus in the left and right directions, and can reduce the load on a user's nose is proposed. A nose pad assembly H has: a movable portion (M2) having a frame (31), and a nose pad (32) attached to the frame (31); and a support mechanism (M1) that is attached to an apparatus body (10), and supports the frame (31). The support mechanism (M1) supports the frame (31) such that a motion of the nose pad (32) in the front and rear directions is allowed.

10 Claims, 11 Drawing Sheets

(56) References Cited

U.S. PATENT DOCUMENTS

| | | | | |
|---|---|---|---|---|
| 5,790,230 | A * | 8/1998 | Sved | A61F 9/025 351/110 |
| 5,971,538 | A * | 10/1999 | Heffner | G02C 5/122 345/8 |
| 6,480,174 | B1 * | 11/2002 | Kaufmann | G02B 27/0172 345/7 |
| 9,470,908 | B1 * | 10/2016 | Frankel | G02C 5/124 |
| 2010/0149073 | A1 * | 6/2010 | Chaum | G02B 27/0172 345/8 |
| 2011/0043436 | A1 * | 2/2011 | Yamamoto | G02B 27/0172 345/8 |
| 2012/0062446 | A1 * | 3/2012 | Sugiyama | G02B 30/24 345/8 |
| 2012/0206816 | A1 * | 8/2012 | Yoshida | G02B 27/0172 359/630 |
| 2016/0266412 | A1 * | 9/2016 | Yoshida | G02C 5/124 |
| 2018/0031847 | A1 * | 2/2018 | Tatsuta | G02B 27/0179 |
| 2018/0329212 | A1 * | 11/2018 | Aiki | G02B 27/0172 |
| 2019/0090808 | A1 * | 3/2019 | Kuronuma | A61B 5/6803 |
| 2020/0278556 | A1 * | 9/2020 | Chae | A61B 5/16 |

FOREIGN PATENT DOCUMENTS

| | | |
|---|---|---|
| JP | 2011-100009 A | 5/2011 |
| JP | 2012-168297 A | 9/2012 |
| WO | 2015/079610 A1 | 6/2015 |
| WO | 2015/137165 A1 | 9/2015 |
| WO | WO-2016132974 A1 * | 8/2016 ............ G02C 11/10 |

OTHER PUBLICATIONS

International Search Report and Written Opinion dated Nov. 13, 2018, from International Patent Application No. PCT/JP2018/031427, 9 sheets.

* cited by examiner

HEAD-MOUNTED DISPLAY

CROSS-REFERENCE TO RELATED APPLICATIONS

This application is a national stage of PCT/JP2018/031427, filed on Aug. 24, 2018 and claims priority to Japanese Application No. 2017-182324, filed on Sep. 22, 2017, which are hereby incorporated by reference in their entirely.

TECHNICAL FIELD

The present invention relates to a head-mounted display.

BACKGROUND ART

In the past, head-mounted displays that are mounted on a user's head, and presents videos to a user have been used. Those head-mounted displays include ones having an annular mounting band to surround the head. A head-mounted display of the following PTL 1 has an adjustment mechanism for adjusting the length of its mounting band. In addition, those head-mounted displays include ones having nose pads to be arranged on the user's nose (e.g., PTL 2).

CITATION LIST

Patent Literature

[PTL 1]
PCT Patent Publication No. WO2015/137165
[PTL 2]
Japanese Patent Laid-Open No. 2012-168297

SUMMARY

Technical Problems

When a head-mounted display having nose pads is used, a load acts on a user's nose from the head-mounted display. In particular, a head-mounted display having nose pads and an adjustment mechanism places a load on a user's nose from the nose pads if the adjustment mechanism is manipulated to make the length of a mounting band short. If the nose pads are formed of a soft material in order to reduce the load on the nose, positional misalignment of the display apparatus in the left and right directions relative to the positions of the eyes of a user is undesirably allowed. Even if a display apparatus is providing a high quality video, positional misalignment of the display apparatus inhibits a user from sufficiently recognizing the high quality.

One of objects of the present disclosure is to propose a head-mounted display that can suppress positional misalignment of a display apparatus in the left and right directions, and can reduce the load on a user's nose.

Solution to Problems

According to a head-mounted display proposed in the present specification, the head-mounted display includes: an apparatus body having a display apparatus; a mounting member to which the apparatus body is connected, and which is for mounting on a head of a user; and a nose pad assembly to be arranged on a nose of the user. The nose pad assembly has: a movable portion having a frame, and a nose pad attached to the frame; and a support mechanism that is attached to the apparatus body, and supports the movable portion. The support mechanism is coupled to the frame such that a motion of the nose pad in front and rear directions is allowed. This head-mounted display can suppress positional misalignment of the display apparatus in the left and right directions, and can reduce the load on a user's nose.

DESCRIPTION OF EMBODIMENT

Figure 1:
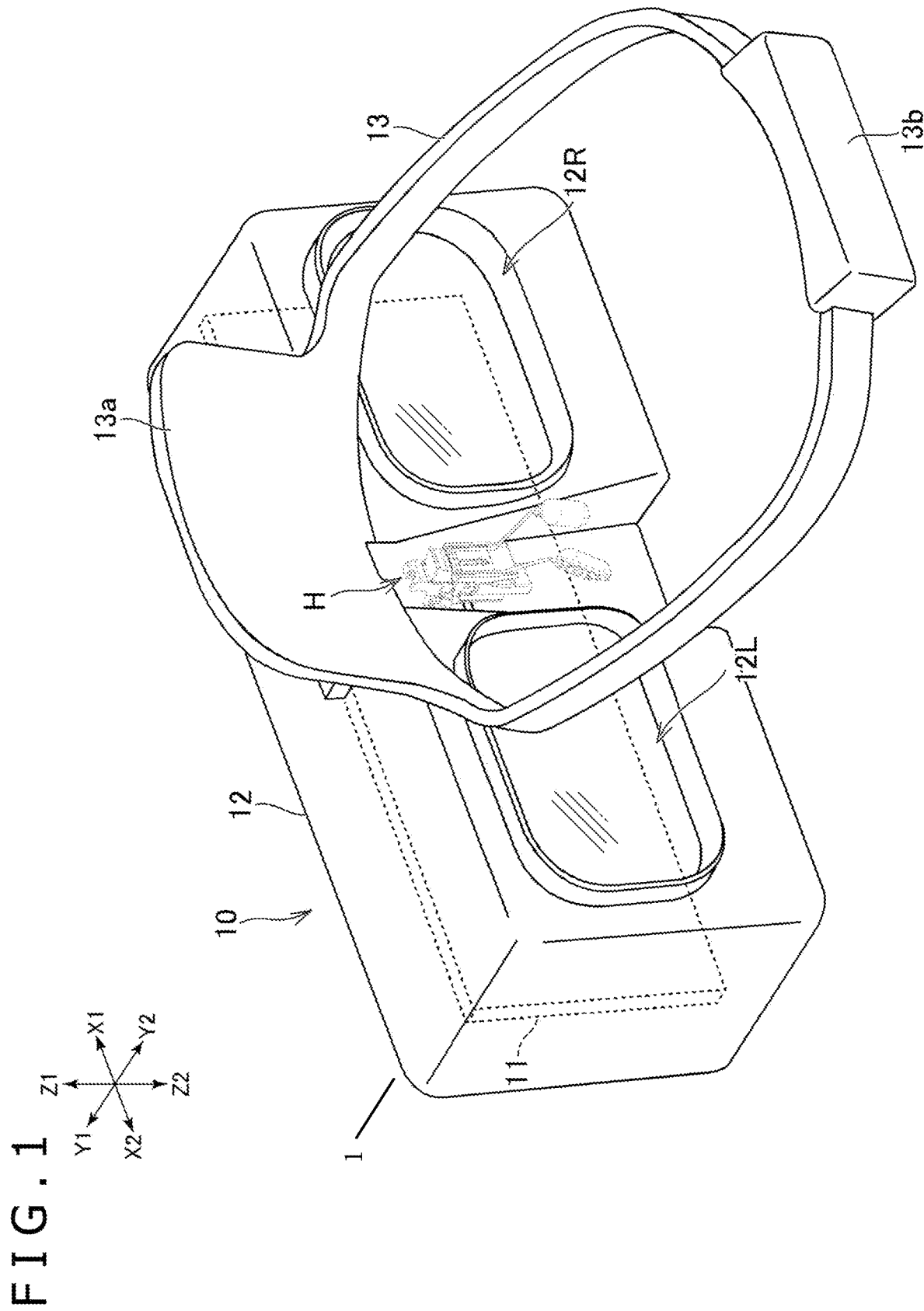
FIG. 1 is a perspective view illustrating a head-mounted display as one example of an embodiment of the present invention.

Hereinafter, an embodiment of the present invention is explained. In the following explanation, the directions indicated by Y1 and Y2 in FIG. 1 are referred to as the front direction and the rear direction, respectively, and the directions indicated by Z1 and Z2 in FIG. 1 are referred to as the upward direction and the downward direction, respectively. In addition, the directions indicated by X1 and X2 in FIG. 1 are referred to as the right direction and the left direction, respectively. In the following explanation, a head-mounted display is referred to as an HMD.

As illustrated in FIG. 1, an HMD 1 has an apparatus body 10 having a display apparatus 11. The display apparatus 11 is a liquid crystal display apparatus or an organic electroluminescence display apparatus, for example, but its type is not particularly limited. When the HMD 1 is used, the display apparatus 11 is arranged before the eyes of a user. In the example of the HMD 1, the apparatus body 10 has a housing 12 that houses the display apparatus 11. The housing 12 has an opening 12R for right eye, and an opening 12L for left eye. The HMD 1 may not have the housing 12. That is, the present invention may be applied to an eye-glass type head-mounted display having an externally exposed display apparatus 11.

As illustrated in FIG. 1, the HMD 1 has, at its upper portion, a mounting band 13 used for mounting the HMD 1 on a user's head. The mounting band 13 has an annular form when seen in a plan view of the HMD 1, and surrounds the user's head when the HMD 1 is used. The mounting band 13 has, at its front portion, a front support portion 13a to contact the forehead of the user. The front support portion 13a is connected to an upper portion of the apparatus body 10. In addition, the mounting band 13 has an adjustment mechanism 13b. The adjustment mechanism 13b is provided with an unillustrated manipulation portion for manipulation by the user. The user can manipulate the manipulation portion to thereby adjust the length of the mounting band 13, and can make the length of the mounting band 13 match the size of his/her head. The structure of the mounting band 13 is not limited to the one in the example of the HMD 1. For example, the mounting band 13 may be connected to a right portion and a left portion of the apparatus body 10.

As illustrated in FIG. 1, a nose pad assembly H that is arranged on the user's nose when the HMD 1 is used, and is for supporting the apparatus body 10 is attached to the apparatus body 10. The nose pad assembly H is arranged at the center of the apparatus body 10 in the left and right directions. In the example of the HMD 1, the nose pad assembly H is positioned between the left and right openings 12R and 12L provided to the housing 12.

Figure 2A:
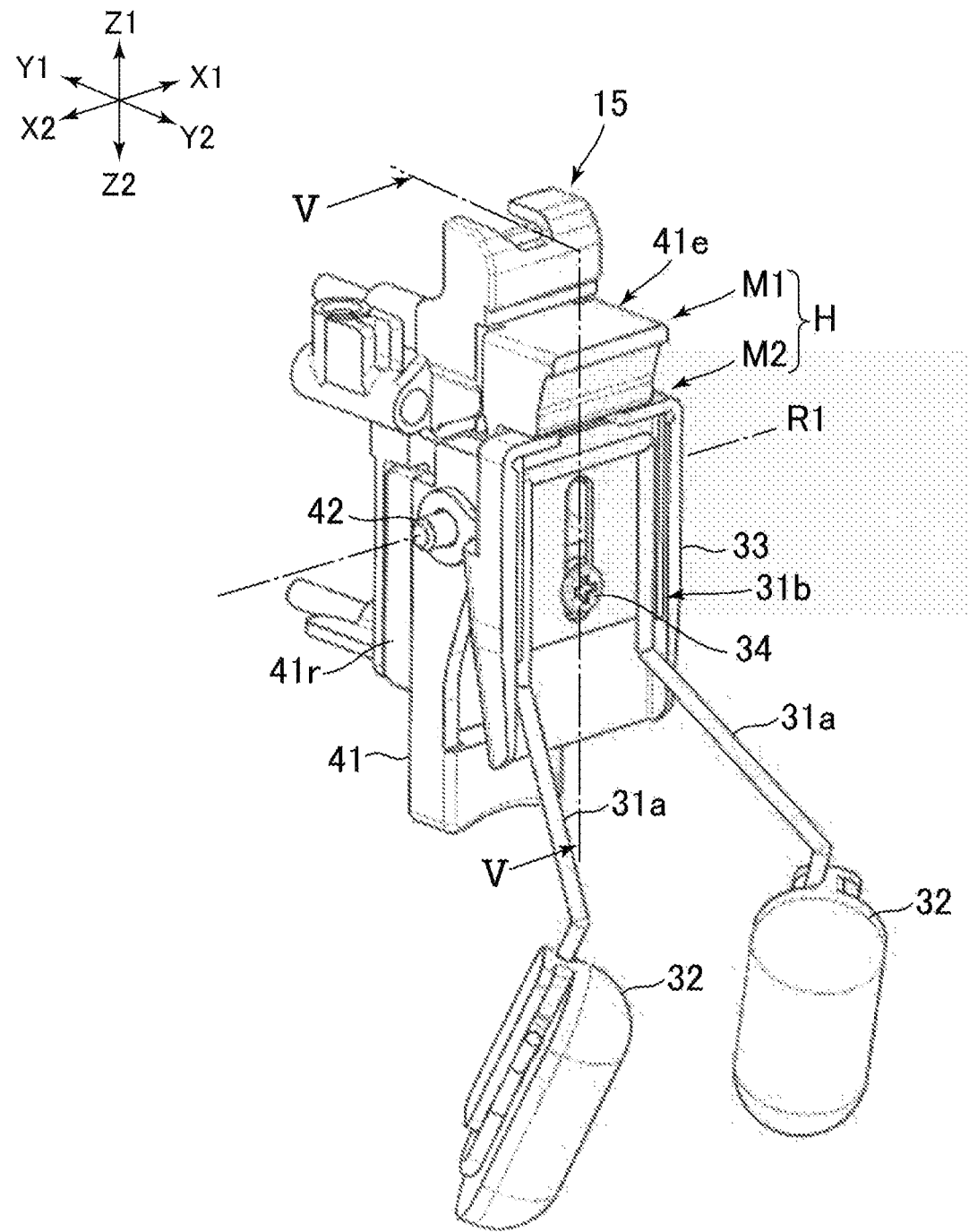
FIG. 2A is a perspective view of a nose pad assembly, and a base member provided to an apparatus body. In this figure, the movable portion of the nose pad assembly is arranged at its initial position.
Figure 2B:
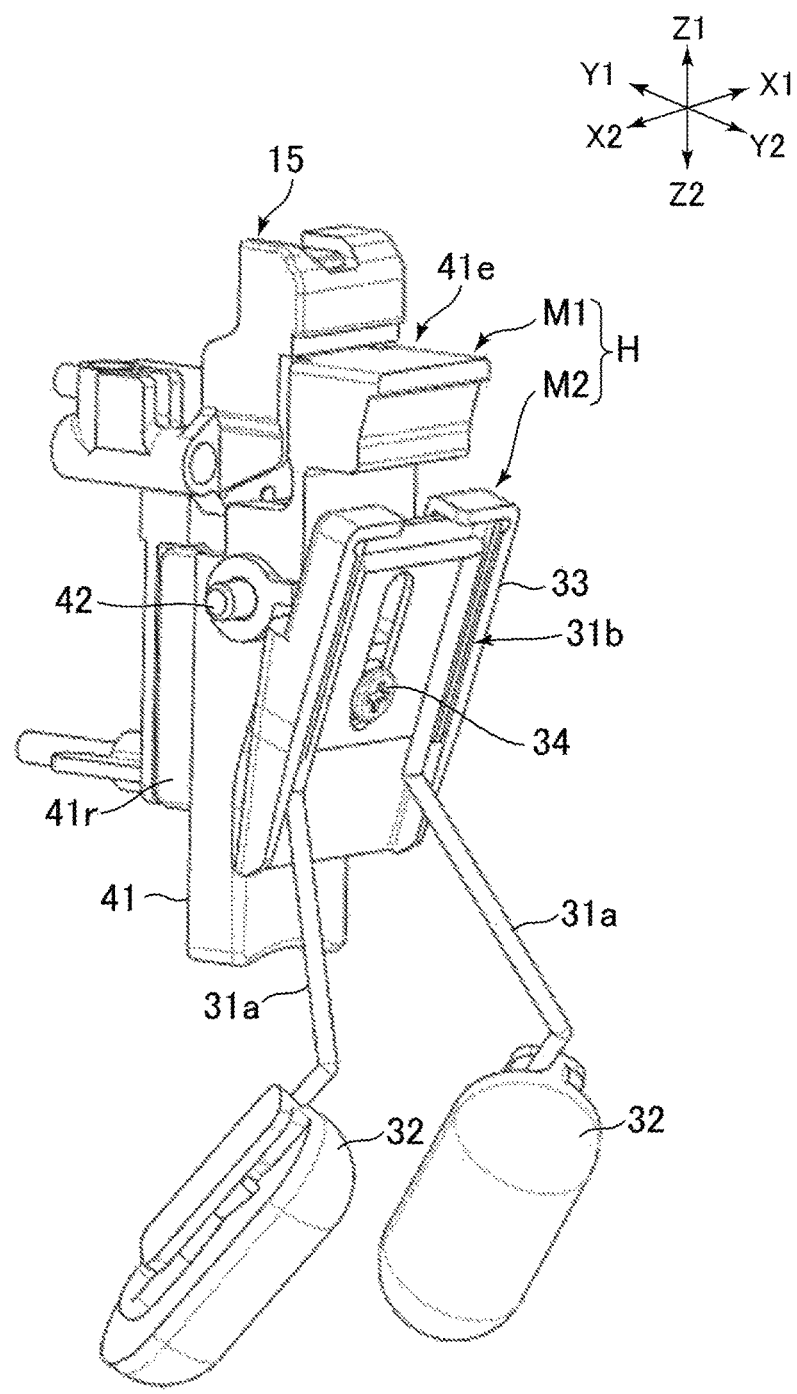
FIG. 2B is a perspective view of the nose pad assembly, and the base member provided to the apparatus body. In this figure, the movable portion of the nose pad assembly is arranged at its maximum tilt position.

As illustrated in FIG. 2A and FIG. 2B, the nose pad assembly H has a movable portion M2. As mentioned below, the movable portion M2 is supported by a support mechanism M1 such that nose pads 32 provided at an end portion of the movable portion M2 can move in the front and rear directions. The movable portion M2 has a frame 31. The nose pads 32 are attached to end portions of the frame 31. When the HMD 1 is used, the nose pads 32 come into contact with the user's nose. The nose pads 32 may be formed of a cushioning material (e.g., rubber) or may be formed of a non-cushioning material (e.g., plastic). The movable portion M2 has two nose pads 32 that are separated from each other in the left and right directions. In the example of the HMD 1, the frame 31 has two extending portions 31a, and the two nose pads 32 are each attached to an end portion of one of the two extending portions 31a.

The frame 31 is formed of a sufficiently rigid material such as metal or plastic, for example. By adopting this configuration, when the HMD 1 is used, the position of the nose pad assembly H is determined by the user's nose, and it is possible to prevent undesirable positional misalignment of the display apparatus 11 in the right or left direction. In the example of the HMD 1, the frame 31 having the two extending portions 31a are formed by bending rod-like metals at multiple positions. The nose pads 32 and the frame 31 may be formed of the same material or may be formed of mutually different materials. If the nose pads 32 and the frame 31 are formed of the same material, they may be formed integrally. If the nose pads 32 and the frame 31 are formed of different materials, the frame 31 may be formed of a material which is more rigid than the material of the nose pads 32.

As illustrated in FIG. 2A, the frame 31 has a plate-like base portion 31b to which base portions of the two extending portions 31a are fixed. The extending portions 31a extend obliquely downward and backward from the base portion 31b. The movable portion M2 has a frame base member 33 coupled to a support member 41 mentioned below. The base portion 31b is fixed to the frame base member 33 by a fixing member (e.g., a screw 34).

The structure of the movable portion M2 is not limited to the one in the example of the HMD 1. For example, the left and right nose pads 32 may be continuous with each other. In this case, the frame 31 may support the nose pads 32 by one extending portion. In a still another example, the frame base member 33 may be a member formed integrally with the frame 31. In this case, the frame 31 and the frame base member 33 may be formed of plastic.

Figure 4A:
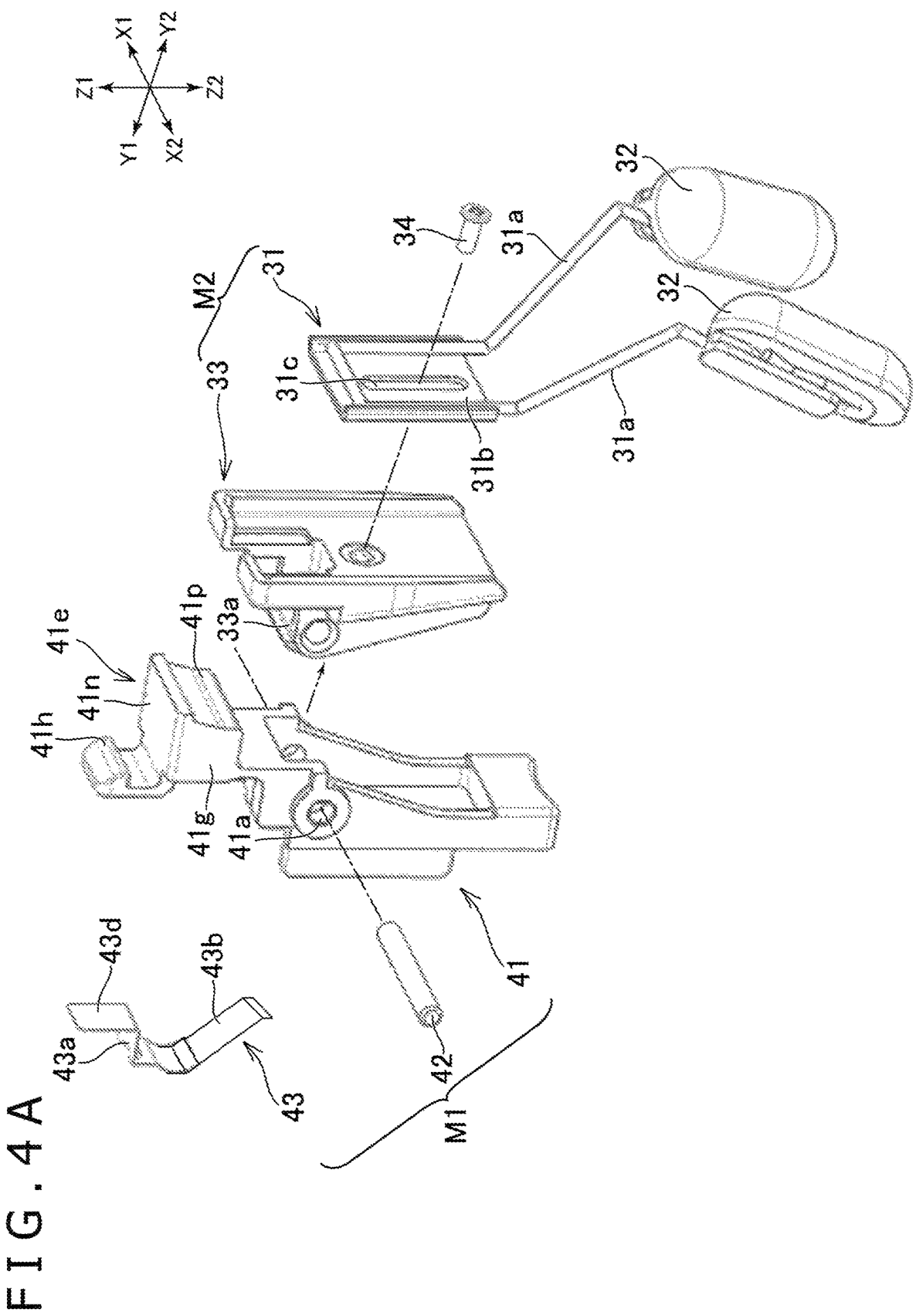
FIG. 4A is an exploded perspective view of the movable portion of the nose pad assembly.

The position of the frame 31 in the movable portion M2 is adjustable vertically. More specifically, the position of the frame 31 relative to the frame base member 33 is adjustable vertically. As mentioned above, in the example of the HMD 1, the base portion 31b of the frame 31 is attached to the frame base member 33 by the screw 34. As illustrated in FIG. 4A, a hole 31c into which the screw 34 is inserted is formed in the base portion 31b. The hole 31c is a thin, vertically long hole. Accordingly, the user can adjust the height of the movable portion M2, that is, the height of the nose pads 32 in accordance with the position of his/her nose. The HMD 1 may not necessarily have such a mechanism for adjusting the height of the nose pads 32.

Figure 4B:
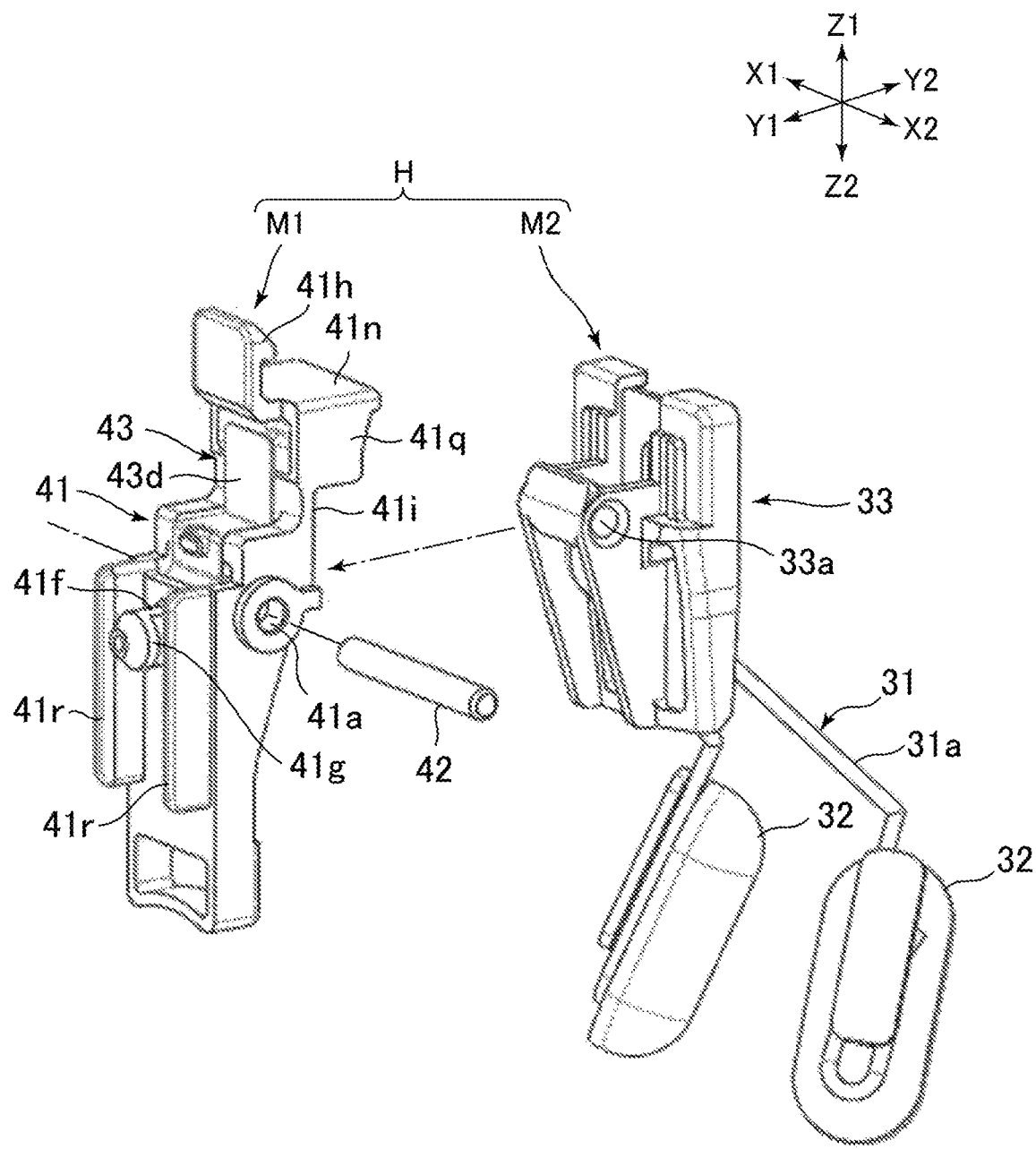
FIG. 4B is an exploded perspective view of the movable portion of the nose pad assembly.

As illustrated in FIG. 4A and FIG. 4B, the nose pad assembly H has the support mechanism M1 supporting the movable portion M2. The support mechanism M1 is attached to the apparatus body 10, and supports the frame 31 such that motions of the nose pads 32 in the front and rear directions are allowed. The support mechanism M1 can reduce the load acting on the user's nose. For example, the load acting on the user's nose can be reduced by the user manipulating the adjustment mechanism 13b to make the length of the mounting band 13 match the size of his/her head. As a result, the user can wear the HMD 1 comfortably. In addition, it is possible to adapt to various sizes of users' noses with the nose pad assembly H. As a result, the user can wear the HMD 1 comfortably regardless of what the size of his/her nose is.

Figure 5:
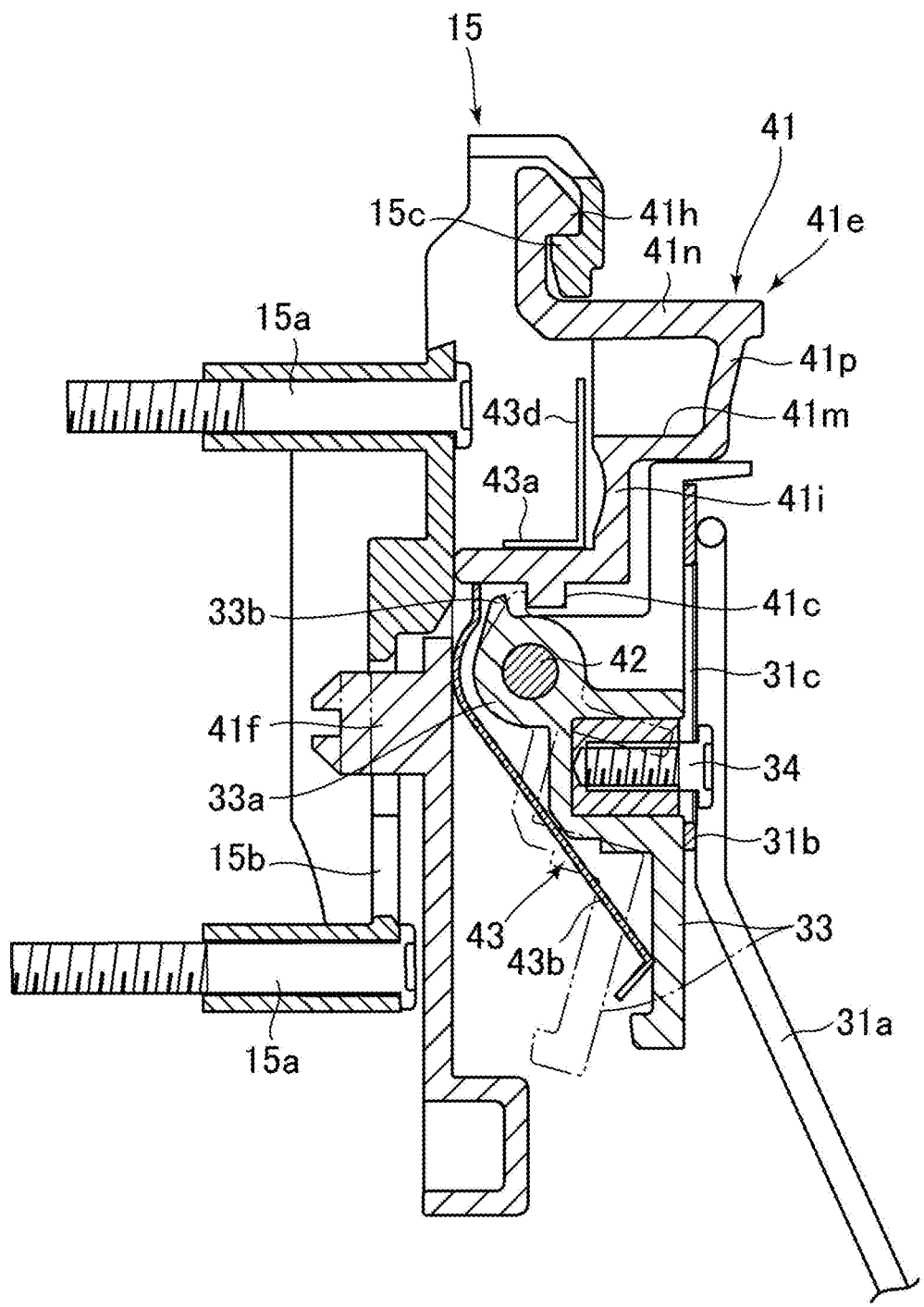
FIG. 5 is a cross-sectional view taken along a line V-V illustrated in FIG. 2A.

In the example of the HMD 1, as illustrated in FIG. 4A and FIG. 4B, the support mechanism M1 has the support member 41, and a support shaft 42 supported by the support member 41 and arranged along the left and right directions. The support member 41 supports the frame 31 via the support shaft 42. Specifically, the support shaft 42 is inserted into a hole 41a formed in the support member 41, and a tube portion 33a formed in the frame base member 33 to which the frame 31 is attached. Accordingly, the frame base member 33 and the frame 31 are rotatable about the support shaft 42 (i.e., an axis R1 along the left and right directions (see FIG. 2A)), and the nose pads 32 can move in the front and rear directions about the support shaft 42. The nose pads 32 are positioned below the support shaft 42 as illustrated in FIG. 5.

The support mechanism M1 is not limited to the one in the example of the HMD 1. For example, the support shaft 42 may be formed integrally with the support member 41. Then, the frame base member 33 may be configured to be caught by the support shaft 42. In a still another example, the support shaft 42 may be a part formed integrally with the frame base member 33. Then, the support member 41 may be configured to be caught by this support shaft. In a still another example, the support mechanism M1 may support the frame 31 such that the movable portion M2 can move parallel to the front and rear directions.

The movable portion M2 can move between its initial position (see FIG. 2A) and its maximum tilt position (see FIG. 2B) determined in front of the initial position. The support mechanism M1 has an elastic member that urges the movable portion 33 toward the initial position. With this structure, the nose pads 32 can be pressed against the user's nose with an appropriate force when the HMD 1 is used, and the stability of the HMD 1 when being worn can be enhanced.

In the example of the HMD 1, the support mechanism M1 has a plate spring 43 (see FIG. 4A) as an elastic member. The plate spring 43 has, at its upper portion, a fixing portion 43a fixed to the support member 41. As illustrated in FIG. 5, the plate spring 43 has a pressing portion 43b that extends downward from the fixing portion 43a to pass the front side of the support shaft 42 mentioned above. The pressing portion 43b is positioned in front of the frame base member 33 mentioned above to which the frame 31 is attached, and urges the frame base member 33 toward the initial position. Since the plate spring 43 presses the frame base member 33 in such a manner, the two nose pads 32 can be urged by the one plate spring 43 toward the initial position. As a result, for example, the number of parts can be reduced as compared to a structure in which a spring is provided for each of two extending portions 31a.

The structure for urging the movable portion M2 toward the initial position is not limited to the one in the example of the HMD 1. For example, the support mechanism M1 may use a coil spring, a torsion spring, rubber or the like as an elastic member, instead of the plate spring 43.

The support mechanism M1 may have a stopper that restricts motions of the movable portion M2 beyond the maximum tilt position. In the example of the HMD 1, as illustrated in FIG. 5, a stopped portion 33b is provided on the outer circumferential surface of the tube portion 33a of the frame base member 33. The stopped portion 33b protrudes from the outer circumferential surface of the tube portion 33a. On the other hand, the support member 41 has a stopper portion 41c. As indicated by a two-dot chain line in FIG. 5, when the movable portion M2 is at the maximum tilt position, the stopped portion 33b hits the stopper portion 41c, and motions of the movable portion M2 beyond the maximum tilt position are restricted. The positions and shapes of the stopped portion 33b and the stopper portion 41c may be changed.

Figure 3A:
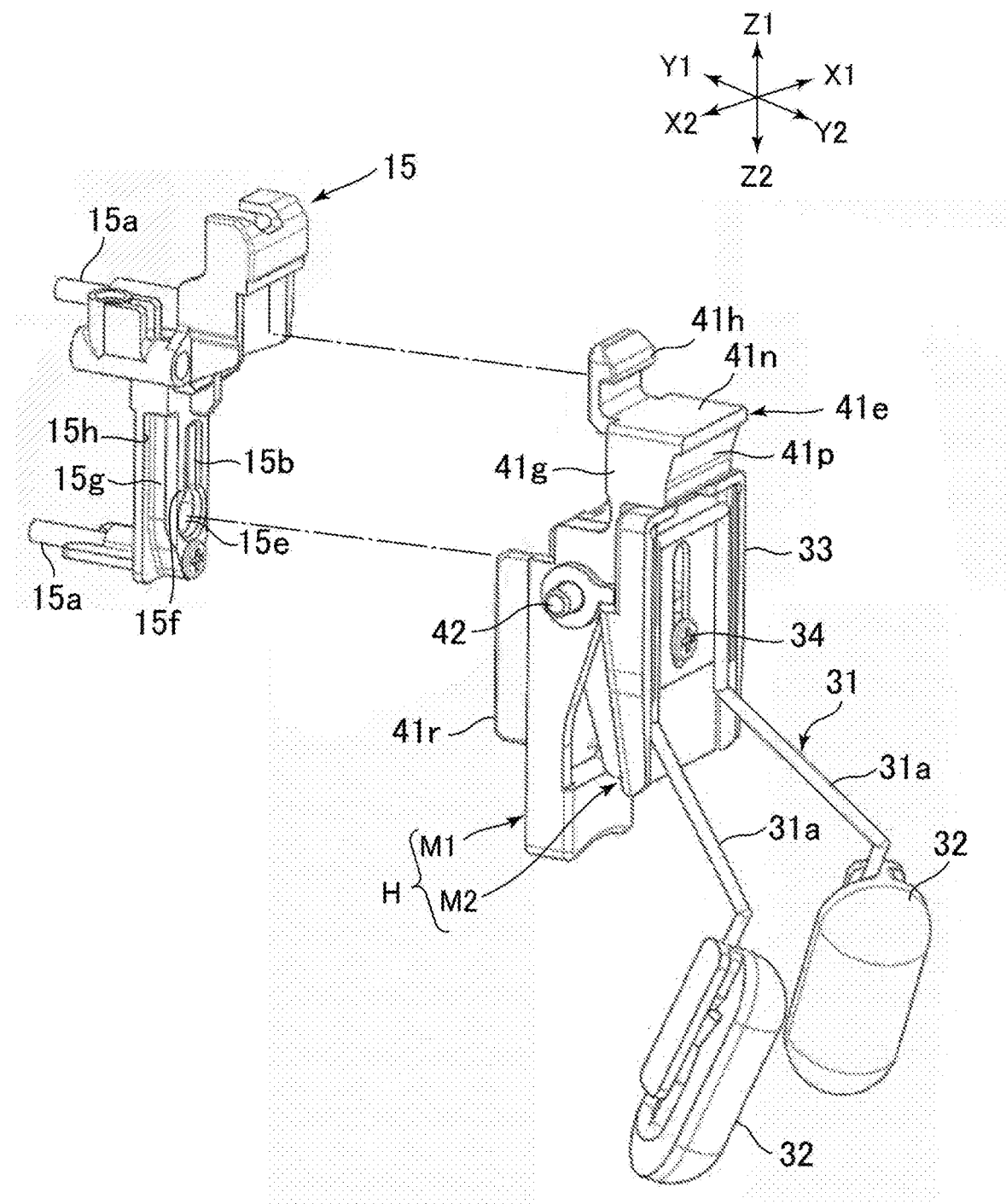
FIG. 3A is a perspective view illustrating a state where the nose pad assembly and the base member are separated.

One of the nose pad assembly H and the apparatus body 10 is provided with a manipulation portion for manipulation by the user. When the manipulation portion is manipulated by the user, the nose pad assembly H can be detached from the apparatus body 10. In the example of HMD 1, as illustrated in FIG. 3A, a manipulation portion 41e is provided to the support member 41, and the user can manipulate the manipulation portion 41e to thereby detach the nose pad assembly H from the apparatus body 10. The user can detach the nose pad assembly H from the apparatus body 10 to thereby wear the HMD 1 easily while using eye glasses, for example.

As illustrated in FIG. 3A, the apparatus body 10 has a base member 15. The base member 15 is attached to the housing 12 by a fixing member (e.g., screws 15a (see FIG. 5)). If the housing 12 has a frame, the base member 15 may be attached to the frame. In a still another example, the base member 15 may be formed integrally with the housing 12 or the frame.

The support member 41 is attached to the base member 15. Specifically, as illustrated in FIG. 3A, a hole 15b is formed in the base member 15. The support member 41 has a protruding portion 41f (see FIG. 3B and FIG. 5) that fits the hole 15b. The protruding portion 41f has, at its end portion, an engaging portion 41g (see FIG. 3B) thicker than the other portion of the protruding portion 41f. In the example of the HMD 1, the width of the engaging portion 41g in the left and right directions is larger than the width of the other portion of the protruding portion 41f. The engaging portion 41g is caught by the edge of the hole 15b formed in the base member 15. By adopting this configuration, backward movement of the engaging portion 41g, that is, backward movement of the nose pad assembly H is restricted. That is, separation of the nose pad assembly H from the base member 15 (i.e., separation from the apparatus body 10) is restricted.

As illustrated in FIG. 3A, the hole 15b is a thin, vertically long hole. The hole 15b includes, at its lowermost portion, a large diameter portion 15e larger than the other portion of the hole 15b. The size of the large diameter portion 15e is larger than the width, in the left and right directions, of the engaging portion 41g (an end portion of the protruding portion 41f) of the support member 41. Accordingly, when the protruding portion 41f is at the lowermost portion of the hole 15b, the support member 41 can be detached backward from the base member 15. In contrast, when the protruding portion 41f is at a position higher than the lowermost portion, separation of the support member 41 from the base member 15 is restricted. Hereinbelow, the position of the nose pad assembly H when the protruding portion 41f is at the lowermost portion (the large diameter portion 15e) of the hole 15b is referred to as the "separation position."

As illustrated in FIG. 4A, the support member 41 has, at its uppermost portion, the manipulation portion 41e mentioned above. The manipulation portion 41e has, at its upper end, an engaging portion 41h. The engaging portion 41h has a hook-like form, for example. On the other hand, the base member 15 has an engaged portion 15c (see FIG. 5). When the protruding portion 41f of the support member 41 mentioned above is positioned at an upper portion of the hole 15b of the base member 15, the engaging portion 41h is engaged with the engaged portion 15c (see FIG. 5). Engagement between the engaging portion 41h and the engaged portion 15c restricts downward movement of the nose pad assembly H (i.e., movement of the nose pad assembly H toward the separation position) (hereinbelow, the position of the nose pad assembly H in a state where the engaging portion 41h is engaged with the engaged portion 15c is referred to as the "lock position."). That is, engagement between the engaging portion 41h and the engaged portion 15c maintains attachment of the nose pad assembly H to the apparatus body 10.

The user can manipulate the manipulation portion 41e to release the engagement between the engaged portion 15c and the engaging portion 41h to thereby move the nose pad assembly H to the separation position mentioned above, and can detach the nose pad assembly H from the base member 15. During the operation for attachment of the nose pad assembly H, the protruding portion 41f of the support member 41 is inserted into the large diameter portion 15e of the hole 15b of the base member 15, and thereafter the nose pad assembly H is slid upward. Then, when the nose pad assembly H is arranged at the lock position mentioned above, the engaging portion 41h of the manipulation portion 41e is engaged with the engaged portion 15c, and the engaging portion 41g of the protruding portion 41f is caught by the edge of the hole 15b. Thus, attachment to the base member 15 of the nose pad assembly H is realized. In such a manner, the nose pad assembly H is made movable vertically between the lock position and the separation position.

As illustrated in FIG. 5, the manipulation portion 41e extends upward from the position of the support shaft 42. In the example of the HMD 1, the manipulation portion 41e has an elastic portion 41i positioned at a lower portion of the manipulation portion 41e and extending upward. The elastic portion 41i is elastically swingable in the front and rear directions about its lower end. The engaging portion 41h is positioned in front of the engaged portion 15c of the base member 15. Accordingly, when the manipulation portion 41e is pressed forward, the elastic portion 41i inclines forward, and the engagement between the engaging portion 41h and the engaged portion 15c is released.

Note that the structure for detaching the nose pads 32 is not limited to the one in the example of the HMD 1. For example, not the entire nose pad assembly H may be detached from the base member 15, but only the movable portion M2 or only the nose pads 32 and frame 31 may be detachable from the apparatus body 10. In a still another example, one of the nose pad assembly H and the apparatus body 10 may be provided with a part that the user can pull, as a manipulation portion for manipulation by the user.

In the example of the HMD 1, the support member 41 having the manipulation portion 41e is formed of plastic. The elastic portion 41i may be reinforced by another member. For example, the elastic portion 41i may be reinforced by a member formed of metal. In the example of the HMD 1, the plate spring 43 that urges the movable portion M2 toward the initial position functions as a reinforcing member. Specifically, as illustrated in FIG. 5, the plate spring 43 has a reinforcing portion 43d extending upward from the fixing portion 43a. The reinforcing portion 43d is positioned in front of the elastic portion 41i of the manipulation portion 41e. When the manipulation portion 41e is pressed forward, and the elastic portion 41i inclines forward, the reinforcing portion 43d prevents the elastic portion 41i from inclining excessively largely. Since part of the plate spring 43 is used as the reinforcing portion 43d in such a manner, it is possible to attempt to reduce the number of parts. Note that a gap may be provided between the reinforcing portion 43d and the elastic portion 41i. In this case, it is possible to press the manipulation portion 41e with a relatively small force until the elastic portion 41i hits the reinforcing portion 43d. After the elastic portion 41i hits the reinforcing portion 43d, a larger force is required to press the manipulation portion 41e, and it is possible to prevent the reinforcing portion 41i from inclining excessively largely.

As illustrated in FIG. 5, the manipulation portion 41e has a lower horizontal portion 41m, an upper horizontal portion 41n, and a pressed portion 41p between the engaging portion 41h and the elastic portion 41i. The lower horizontal portion 41m extends backward from the upper end of the elastic portion 41i. The pressed portion 41p extends upward from the rear end of the lower horizontal portion 51m, and is positioned behind the other portion of the manipulation portion 41e. Because of this, the user can press the pressed portion 41p when he/she manipulates the manipulation portion 41e. The upper horizontal portion 41n extends forward from the upper end of the pressed portion 41p, and is continuous with the engaging portion 41h.

As illustrated in FIG. 3A, the manipulation portion 41e has reinforcing wall portions 41q at the left and right edges of the lower horizontal portion 41m, the upper horizontal portion 41n, and the pressed portion 41p, the reinforcing wall portions 41q making those edges continuous with each other. These reinforcing wall portions 41q can enhance the rigidity of the manipulation portion 41e, and can suppress deformation of parts other than the elastic portion 41i.

Figure 3B:
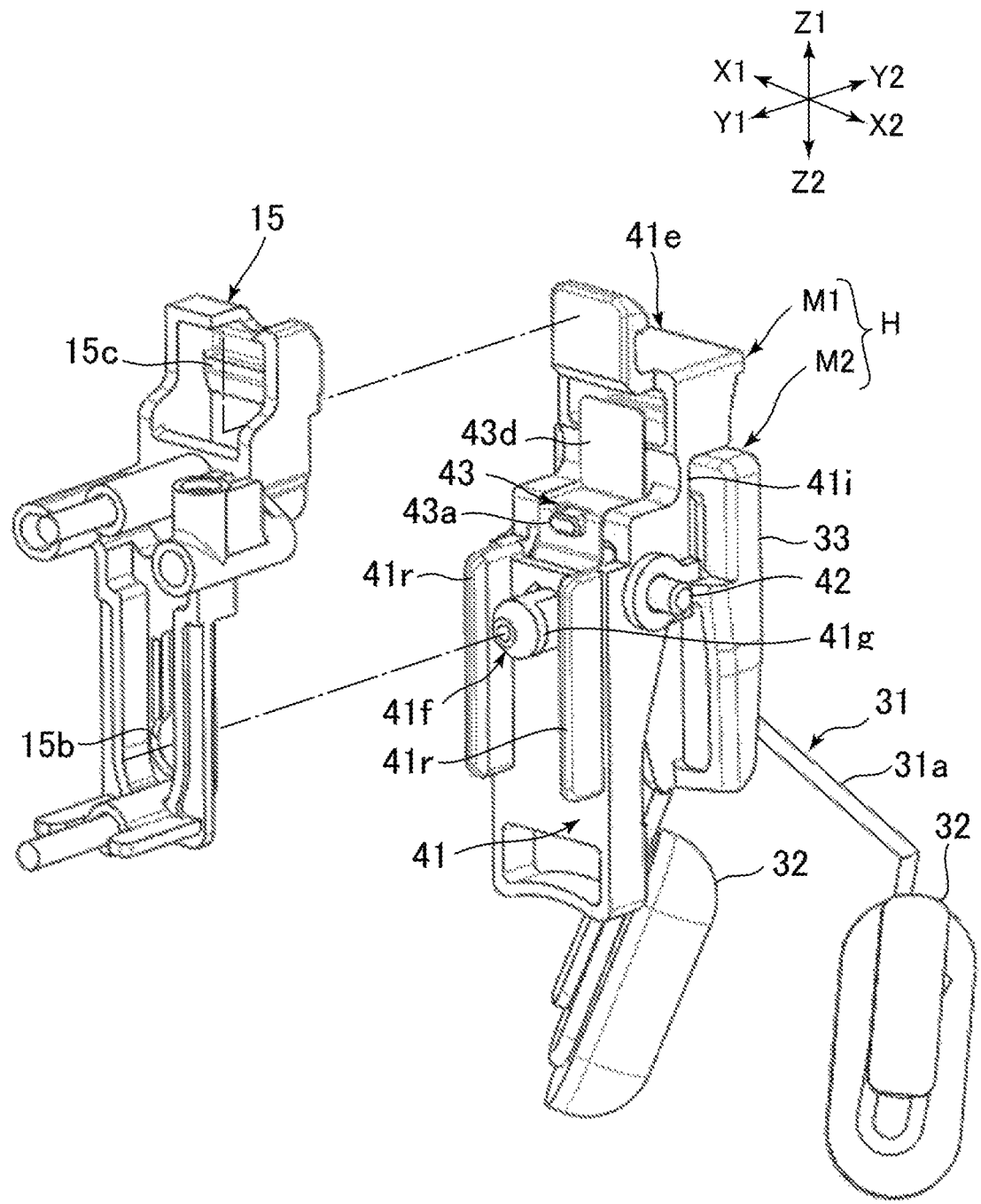
FIG. 3B is a perspective view illustrating a state where the nose pad assembly and the base member are separated.

The nose pad assembly H and the apparatus body 10 have a guide portion and a guided portion, respectively, that determine the position of the nose pad assembly H relative to the apparatus body 10 in the left and right directions, and in the front and rear directions, and allows relative vertical motions of them. In the example of HMD 1, as illustrated in FIG. 3B, the support member 41 has guided portions 41r extending vertically, and protruding toward the base member 15. The guided portions 41r are formed to the right and left of the protruding portion 41f, for example. On the other hand, as illustrated in FIG. 3A, the base member 15 has a guide portion 15f arranged between the left and right guided portions 41r. The hole 15b mentioned above is formed in the guide portion 15f. The inner surfaces of the left and right guided portions 41r contact the left and right side surfaces 15g of the guide portion 15f, and thereby the guide portion 15f determines the positions of the guided portions 41r in the left and right directions. The guide portion 15f, and the left and right guided portions 41r are relatively movable vertically.

As illustrated in FIG. 3A, the guide portion 15f has a front stopper portion 15h positioned in front of the guided portions 41r, and extending vertically. In the example of the HMD 1, the front stopper portion 15h projects rightward and leftward from the side surfaces 15g of the guide portion 15f. The guided portions 41r of the support member 41 contact the front stopper portion 15h. As mentioned above, backward movement of the nose pad assembly H is restricted the action of the protruding portion 41f formed in the support member 41 and the hole 15b of the base member 15. This action of the protruding portion 41f and the hole 15b, and the action of the front stopper portion 15h and the guided portions 41r determine the position of the nose pad assembly H relative to the apparatus body 10 in the front and rear directions.

The structure for determining the position of the nose pad assembly H relative to the apparatus body 10 in the left and right directions, and in the front and rear directions is not limited to the one in the example of the HMD 1. For example, guide grooves may be formed in the base member 15, and the guided portions 41r may be inserted into these grooves. Then, the position in the left and right directions is determined by the edges of the grooves, and the position in the front and rear directions may also be determined by bottom portions of the grooves.

As explained above, in the HMD 1, the nose pad assembly H has the movable portion M2 having the frame 31, and the nose pads 32 attached to the frame 31, and the support mechanism M1 that is attached to the apparatus body 10, and supports the frame 31. The support mechanism M1 supports the frame 31 such that motions of the nose pads 32 in the front and rear directions are allowed. According to this structure, when the HMD 1 is used, the position of the nose pad assembly H is determined by the user's nose, and the frame 31 can prevent undesirable positional misalignment of the display apparatus 11 in the right or left direction. In addition, the load acting on the user's nose can be reduced by the support mechanism M1. For example, the load acting on the user's nose can be reduced when the user manipulates the adjustment mechanism 13b to make the length of the mounting band 13 match the size of his/her head.

Figure 6:
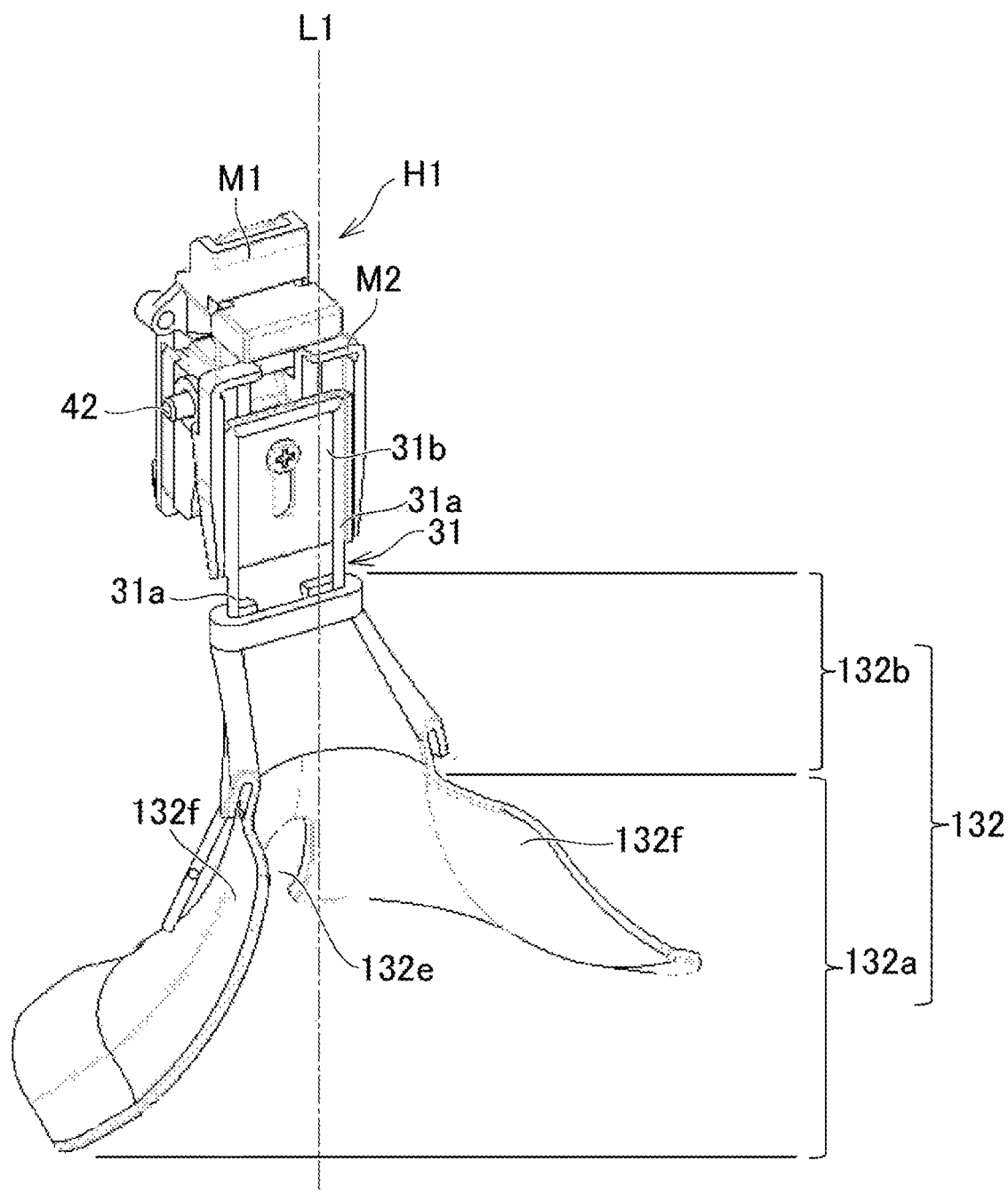
FIG. 6 is a perspective view illustrating a modification of the nose pad assembly.
Figure 7:
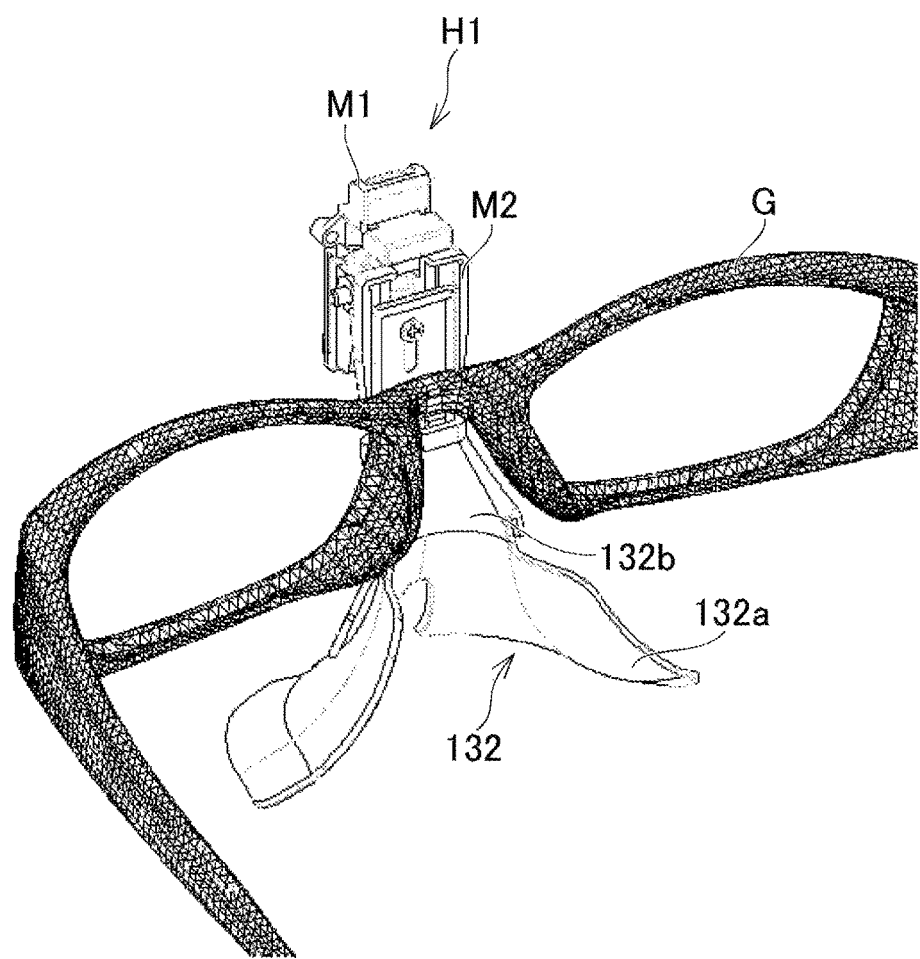
FIG. 7 is a perspective view illustrating the positional relationship between the nose pad assembly illustrated in FIG. 6 and eye glasses.
Figure 8:
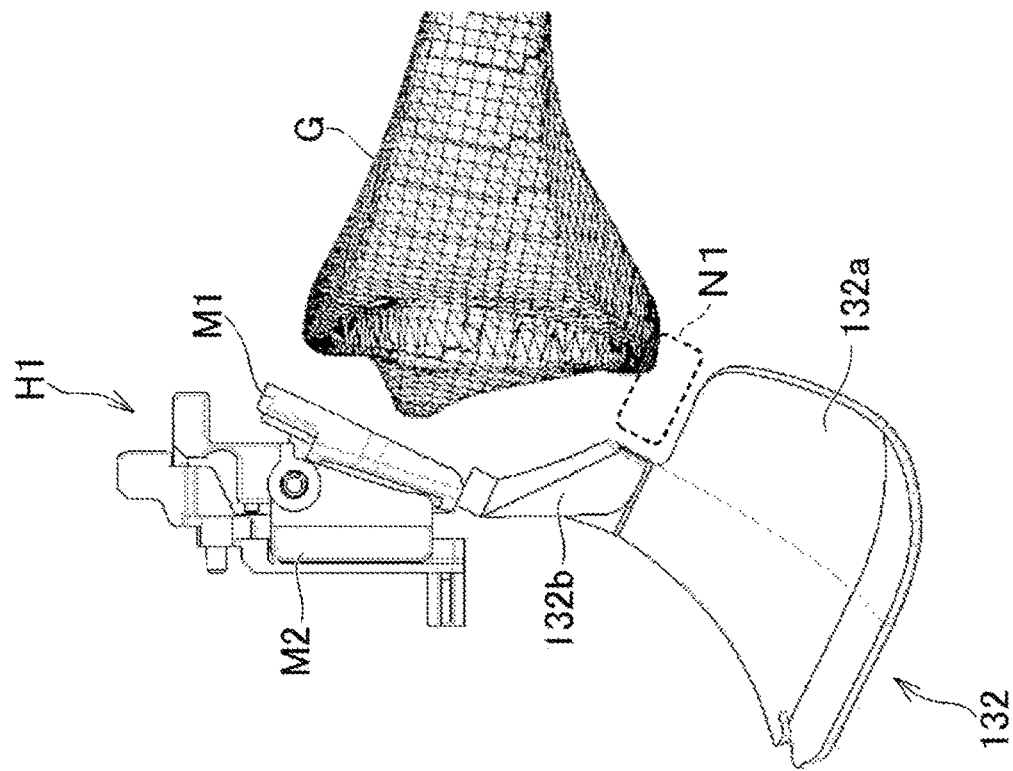
FIG. 8 depicts side views illustrating a motion of the nose pad assembly illustrated in FIG. 6.
Figure 8:
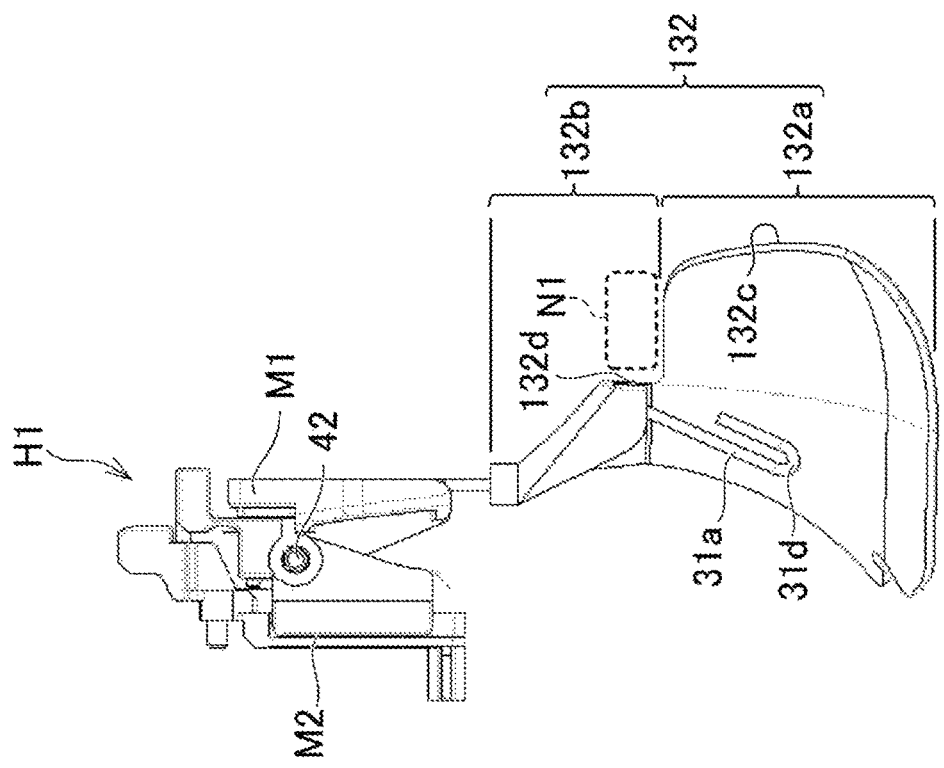

FIG. 6 to FIG. 8 are figures illustrating a nose pad assembly H1 which is a modification of the nose pad assembly H. In these figures, parts which are identical to corresponding parts of the nose pad assembly H explained thus far are given identical symbols. Hereinbelow, mainly, differences from the nose pad assembly H are explained. Matters of the nose pad assembly H1 that are not explained are similar to corresponding matters of the nose pad assembly H.

As illustrated in FIG. 6, the nose pad assembly H1 has a nose pad 132. The nose pad 132 is attached to the frame 31 similar to the nose pads 32 mentioned above. The nose pad 132 is larger than the nose pads 32, and an upper portion 132b of the nose pad 132 is attached to both left and right extending portions 31a of the frame 31. That is, the upper portion 132b is placed across the left and right extending portions 31a. With this attachment structure, the stability of the nose pad 132 in terms of attachment to the frame 31 can be enhanced.

As illustrated in FIG. 6, the nose pad 132 is curved to fit the dorsum of the user's nose. That is, the nose pad 132 is curved to form an arc shape to surround a vertical line L1. This curved shape of the nose pad 132 can enhance the stability of the HMD 1 in terms of support by the user's nose. In addition, the nose pad 132 has a light-blocking portion 132a extending downward. The light-blocking portion 132a is curved to surround the vertical line L1, and spreads apart and farther from the vertical line L1 at portions thereof that are located lower. This shape of the nose pad 132 allows the light-blocking portion 132a to block light that enters from the lower side of the HMD 1 and advances toward the pupils of the user. When the HMD 1 is used, for example, the upper portion 132f of the light-blocking portion 132a, and portions near the upper portion 132f are supported by the user's nose. The light-blocking portion 132a extends downward beyond the lower end 31d of the extending portion 31a of the frame 31 (see FIG. 8A). The light-blocking portion 132a may reach a portion near the lower surface of the HMD 1. Since the light-blocking portion 132a is supported by the frame 31, it can move in the front and rear directions about the support shaft 42 (the axis along the left and right directions) in accordance with the size of the user's nose. Accordingly, high light-blocking property can be achieved regardless of what the size of the user's nose is.

The nose pad 132 is formed of a flexible and/or elastic material (e.g., silicone rubber). Thus, it is possible to make the shape of the nose pad 132 fit the shape of the user's nose. In the nose pad assembly H1, the frame 31 supports the nose pad 132 by means of the two rod-like extending portions 31a. Accordingly, the shape of the light-blocking portion 132a is confined not completely by the frame 31, but when the HMD 1 is used, the light-blocking portion 132a can be deformed in accordance with the user's nose. As illustrated in FIG. 8A, in the example of the nose pad assembly H1, the light-blocking portion 132a extends downward beyond the lower end 31d of the frame 31, and the portion thereof positioned below the lower end 31d of the frame 31 has a high degree of freedom in terms of its shape. A slit 132e may be formed between a right portion and a left portion of the light-blocking portion 132a. The slit 132e can further increase the degree of freedom of the shape of the light-blocking portion 132a.

The size/shape of the frame 31, and the size/shape of the light-blocking portion 132a are not limited to the ones in the example of the nose pad assembly H1. For example, the extending portion 31a of the frame 31 may reach the lower end of the light-blocking portion 132a.

As illustrated in FIG. 8A, the nose pad 132 has notches N1 at rear edges (the left and right edges) of its upper portion. In other words, a rear edge 132d of the upper portion 132b is positioned in front of a rear edge 132c of the light-blocking portion (lower portion) 132a. Then, two rear edges 132d and 132c are continuous with each other via a horizontal edge when seen in a side view. The presence of these notches N1 can suppress interference of eye glasses G worn by the user with the nose pad 132 when the user is using the eye glasses G as illustrated in FIG. 8B, and even the user who is using the eye glasses G can use the HMD 1 comfortably. Note that the nose pad 132 illustrated in FIG. 8B is pressed forward by the user's nose, and tilts forward.

The HMD 1, and nose pad assemblies H and H1 are merely examples of the present invention, and the present invention can be modified in various manners. Modifications that are made as appropriate without deviation from the gist of the present invention shall fall within the scope of the present invention.

The invention claimed is:

1. A head-mounted display comprising:
an apparatus body having a display apparatus;
a mounting member to which the apparatus body is connected, and which is for mounting on a head of a user; and
a nose pad assembly to be arranged on a nose of the user, wherein
the nose pad assembly has
a movable portion having a frame, and a nose pad attached to the frame, and
a support mechanism that is attached to the apparatus body, and supports the frame, and
the support mechanism supports the frame such that a motion of the nose pad in front and rear directions is allowed,
wherein the nose pad has an upper portion attached to the frame, and a light-blocking portion extending downward from the upper portion.

2. The head-mounted display according to claim 1, wherein
the support mechanism supports the frame such that the frame is rotatable about an axis portion extending along left and right directions.

3. The head-mounted display according to claim 1, wherein
the frame is capable of moving between a first position which is an initial position and a second position determined in front of the first position, and
the support mechanism has an elastic member that urges the frame toward the first position.

4. The head-mounted display according to claim 3, wherein
the frame has a right extending portion having an end portion to which the nose pad is attached, and a left extending portion having an end portion to which the nose pad portion is attached,
the movable portion has a frame base portion to which a base portion of the right extending portion and a base portion of the left extending portion are attached, and
the elastic member urges the frame base portion.

5. The head-mounted display according to claim 1, wherein
one of the nose pad assembly and the apparatus body has a manipulation portion for manipulation by the user, and
at least the nose pad in the nose pad assembly is detachable from the apparatus body by manipulation of the manipulation portion by the user.

6. The head-mounted display according to claim 5, wherein
the apparatus body has an engaged portion,
the nose pad assembly has an engaging portion,
engagement between the engaging portion and the engaged portion maintains attachment of the nose pad assembly to the apparatus body, and
the engagement between the engaging portion and the engaged portion is capable being released by manipulation of the manipulation portion by the user.

7. The head-mounted display according to claim 6, wherein
the nose pad assembly is capable of moving vertically between a lock position at which separation between the nose pad assembly and the apparatus body is restricted, and a separation position at which separation between the nose pad assembly and the apparatus body is allowed.

8. The head-mounted display according to claim 1, wherein
the nose pad has an upper portion attached to the frame, and a light-blocking portion extending downward from the upper portion.

9. The head-mounted display according to claim 1, wherein
the light-blocking portion is curved to surround a vertical line.

10. The head-mounted display according to claim 1, wherein
the nose pad has notches formed at a right edge and a left edge of the nose pad.

\* \* \* \* \*